United States Patent
Price et al.

(10) Patent No.: US 12,462,289 B2
(45) Date of Patent: Nov. 4, 2025

(54) DEVICE, METHOD, AND COMPUTER-READABLE MEDIA FOR RECOMMENDATION NETWORKING BASED ON CONNECTIONS, CHARACTERISTICS, AND ASSETS USING MACHINE LEARNING

(71) Applicant: Capital One Services, LLC, McLean, VA (US)

(72) Inventors: Micah Price, The Colony, TX (US); Avid Ghamsari, Carrollton, TX (US); Qiaochu Tang, Frisco, TX (US); Geoffrey Dagley, McKinney, TX (US); Staeven Duckworth, Oak Point, TX (US)

(73) Assignee: Capital One Services, LLC, McLean, VA (US)

( * ) Notice: Subject to any disclaimer, the term of this patent is extended or adjusted under 35 U.S.C. 154(b) by 9 days.

(21) Appl. No.: 18/407,739

(22) Filed: Jan. 9, 2024

(65) Prior Publication Data
US 2024/0161166 A1    May 16, 2024

Related U.S. Application Data

(63) Continuation of application No. 17/488,505, filed on Sep. 29, 2021, now Pat. No. 11,907,997.

(51) Int. Cl.
*G06Q 30/06* (2023.01)
*G06N 3/04* (2023.01)
(Continued)

(52) U.S. Cl.
CPC ......... *G06Q 30/0631* (2013.01); *G06N 3/04* (2013.01); *G06Q 30/0625* (2013.01); *H04L 51/52* (2022.05)

(58) Field of Classification Search
CPC ................ G06Q 30/06; G06Q 30/0631
See application file for complete search history.

(56) References Cited

U.S. PATENT DOCUMENTS

| | | | |
|---|---|---|---|
| 2011/0040602 A1* | 2/2011 | Kurani | G06Q 30/0641 705/14.19 |
| 2012/0209677 A1 | 8/2012 | Mehta et al. | |

(Continued)

OTHER PUBLICATIONS

Figueiredo, C. M. M. d. (2014). Emotions and recommender systems: A social network approach (Order No. 10596737). Available from ProQuest Dissertations and Theses Professional. (1916795899). Retrieved from https://dialog.proquest.com/professional/docview/1916795899?accountid=131444.*

(Continued)

*Primary Examiner* — Jeffrey A. Smith
*Assistant Examiner* — Jennifer V Lee
(74) *Attorney, Agent, or Firm* — Banner & Witcoff, Ltd.

(57) ABSTRACT

Methods, systems, and apparatuses are described herein for providing purchase recommendations by analyzing social networks using machine learning. A machine learning model may be trained to select one or more of the first plurality of users. Purchase intention data that indicates an intention of a first user to acquire a type of asset may be received. Social networking data that comprises a plurality of associations between a second plurality of users may be received. Purchase history data indicating one or more purchases, of one or more assets associated with the type of asset, made by the second plurality of users may be received. The trained machine learning model may be provided the data. In return, the trained machine learning model may provide an indication of a second user. A notification may be sent to the second user.

20 Claims, 6 Drawing Sheets

(51) Int. Cl.
*G06Q 30/0601* (2023.01)
*H04L 51/52* (2022.01)

(56) References Cited

U.S. PATENT DOCUMENTS

| | | |
|---|---|---|
| 2014/0052576 A1 | 2/2014 | Zelenka et al. |
| 2014/0067596 A1* | 3/2014 | McGovern ......... G06Q 30/0246 705/26.7 |
| 2015/0220836 A1* | 8/2015 | Wilson ............... G06Q 30/0269 706/46 |
| 2016/0350834 A1* | 12/2016 | Wilson ............... G06Q 30/0631 |
| 2017/0316477 A1 | 11/2017 | Prasad |
| 2018/0075514 A1* | 3/2018 | Madhvanath ......... G06Q 50/01 |
| 2018/0089735 A1 | 3/2018 | Lenahan et al. |
| 2019/0052701 A1 | 2/2019 | Rathod |
| 2019/0220878 A1 | 7/2019 | Linden et al. |

OTHER PUBLICATIONS

Figueiredo, C.M.M.d. "Emotions and recommender systems: A social network approach" Available from ProQuest Dissertations and Theses Professional (Order No. 10596737) (1916795899) Retrieved from https://dialog.proquest.com/professional/docview/1916795899?accountid=131444.

* cited by examiner

DEVICE, METHOD, AND COMPUTER-READABLE MEDIA FOR RECOMMENDATION NETWORKING BASED ON CONNECTIONS, CHARACTERISTICS, AND ASSETS USING MACHINE LEARNING

CROSS-REFERENCE TO RELATED APPLICATIONS

This application is a continuation of U.S. application Ser. No. 17/488,505, filed Sep. 29, 2021, which is hereby incorporated by reference in its entirety.

FIELD OF USE

Aspects of the disclosure relate generally to computer-implemented social networks. More specifically, aspects of the disclosure may leverage machine learning to connect users with knowledgeable product owners based on their social network connections.

BACKGROUND

While the Internet has made the shopping process easier in many ways, it can also be overwhelming. Virtually any category of good or service is accompanied with hundreds, if not thousands, of reviews from purported customers and authorities. Even if those reviews were valid and accurate, their volume often prevents users from fully analyzing and considering them before making a purchase decision. Moreover, there is an increasing concern that such reviews are fake and/or paid for, such that the reviews are unreliable in the first place.

Many users rely heavily on their friends and family for advice regarding purchase decisions. For example, a customer looking to purchase an asset like a home or vehicle may take family and/or friends with them when testing out the asset (e.g., visiting the home, test driving the vehicle), thereby asking their family and/or friends to provide input into their purchasing decision. In many ways, customers can value the input from their family and friends more than they do input from strangers on the Internet. That said, an individual might not know which friends and/or family to reach out to regarding an intended purchase. For example, a customer might not know that a distant friend may have recently purchased the very same asset they are interested in purchasing, such that the distant friend may have valuable insight into the purchasing process (e.g., whether to buy from a particular seller, whether the asset is a good purchase, etc.).

Aspects described herein may address these and other problems, and generally improve the purchasing process by using machine learning techniques to identify connections between potential customers and their social network connections, particularly where such connections would allow those social network connections to provide advice regarding intended purchases of assets.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein relate to machine learning-implemented knowledge sharing as part of the shopping process. A user shopping for goods and/or services may rely heavily on the opinions of friends and relatives as part of their purchasing decision. That said, that user may have no knowledge of whether their friends and family have any experience with the asset they are shopping for. For example, a user may be in the market for a newer-model Sport Utility Vehicle (SUV), but might not know which of their friends and/or family own an SUV or may have recently been in the market for an SUV. This problem may become even more complicated in circumstances where the user has multiple friends and/or family that may have at one point owned an asset they are currently shopping for. For example, a user might not know that their friend once owned a newer-model SUV, but ultimately sold it because they did not like it. The aspects described herein address these and other issues by leveraging machine learning techniques. A machine learning model may be trained to analyze data and select connections between two of a plurality of users. That trained machine learning model may be used to analyze complex sets of input data, such as purchase intention data (e.g., which reflects an intention of a first user to purchase an asset), social networking data (e.g., with reflects connections between the first user and a plurality of different users), and/or purchase history data (e.g., which reflects purchases made by the plurality of different users). The trained machine learning model may output, based on that input, an indication of at least one of the plurality of different users, thereby selecting a user that may have knowledge of value regarding the intended purchase. Then, that at least one of the plurality of different users may be prompted to reach out to the first user. In this manner, the second user may be prompted to share their insights about an asset with the first user. For example, the second user may be able to warn a user about problems with the asset, merchants to avoid, or the like.

More particularly, some aspects described herein may provide for a computing device that may train, using training data indicating connections between a first plurality of users, characteristics of the first plurality of users, and a plurality of assets purchased by the first plurality of users, a machine learning model to select one or more of the first plurality of users. The computing device may receive purchase intention data that indicates an intention of a first user to acquire a type of asset. That purchase intention data may indicate characteristics of the first user and preferences of the first user corresponding to the type of asset. The computing device may receive social networking data that comprises a plurality of associations between a second plurality of users. The computing device may receive purchase history data indicating one or more purchases, of one or more assets associated with the type of asset, made by the second plurality of users. The computing device may provide, to the trained machine learning model, input data comprising the purchase intention data, the social networking data, and the purchase history data. The computing device may receive, as output from the trained machine learning model and based on the input data, an indication of at least one second user of the second plurality of users. The at least one second user may be associated with a purchase of a second asset associated with the type of asset. The computing device may generate, for the at least one second user, a notification prompting the second user to contact the first user regarding the intention of the first user to acquire the type of asset. The computing device may cause the notification to be transmitted to the second user.

According to some embodiments, the computing device may receive the purchase intention data by collecting web activity data by monitoring web browsing activity of the first user and detecting, based on the web activity data, that the first user is browsing web pages associated with the type of asset. The computing device may process the purchase history data to identify one or more merchants where the second plurality of users purchased the one or more assets. The input data may further comprise an indication of the one or more merchants. The computing device may determine a similarity between the type of asset and the one or more assets. The input data may further comprise an indication of the similarity between the type of asset and the one or more assets. The computing device may determine a similarity between the characteristics of the first user and characteristics of the second plurality of users. The input data may further comprise an indication of the similarity between the characteristics of the first user and characteristics of the one or more users. The input data may further comprise an indication of whether the first user and the second plurality of users are members of a group. The purchase history data may indicate a recency of purchase, one or more assets, by the second plurality of users. At least a portion of the first plurality of users may be the same as the second plurality of users.

Corresponding method, apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
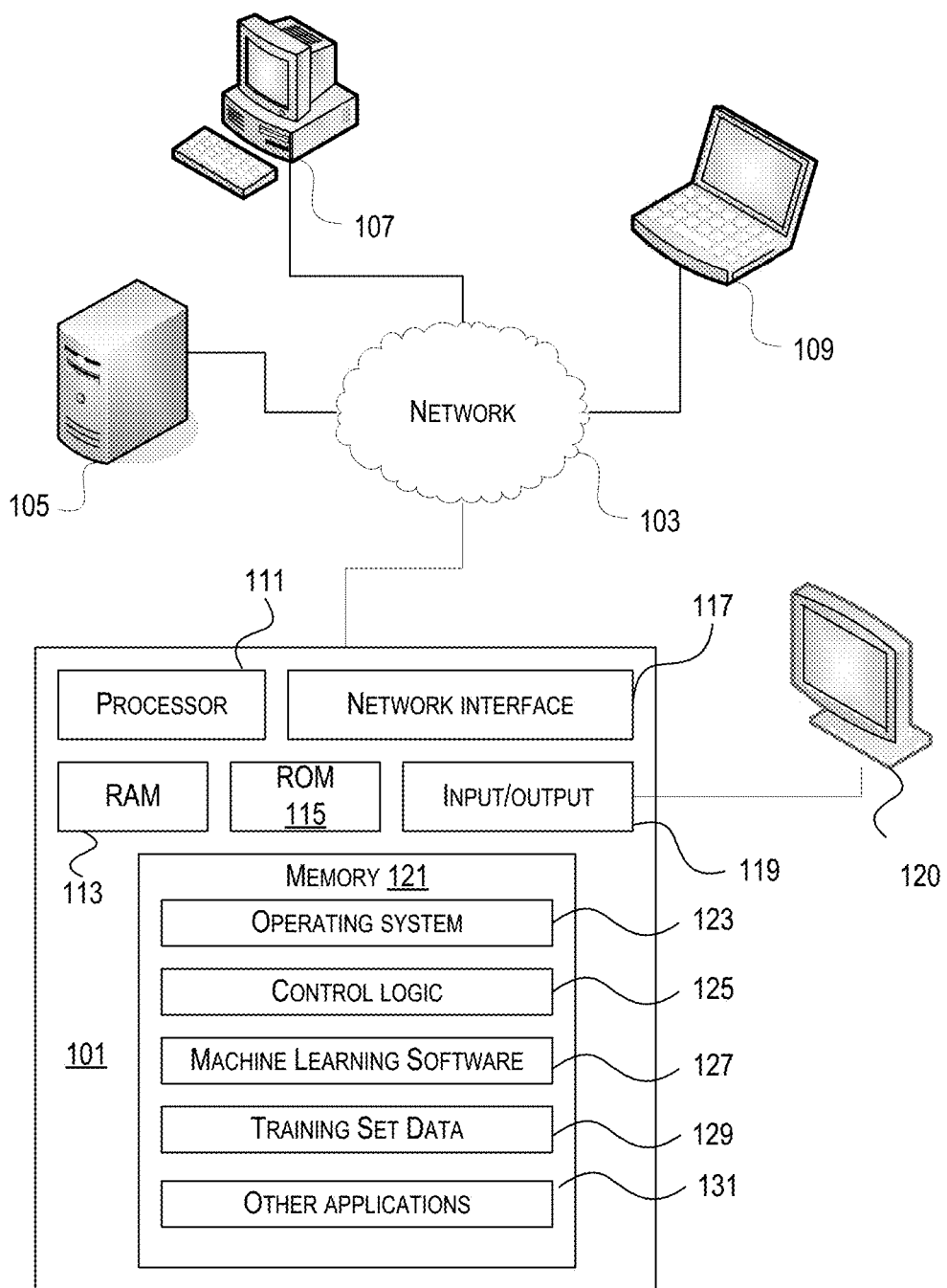
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to connecting users in a manner which allows for the exchange of information about purchases. A trained machine learning model may be used to select a connection between a first user (e.g., a potential purchaser of an asset) and at least one second user (e.g., that has purchased the same asset, or something like the asset, in the past). To perform this task, the trained machine learning model may receive input data that includes purchase intention data (e.g., reflecting what the first user would potentially like to purchase), social networking data (e.g., reflecting connections between the first user and a plurality of different users), and purchase history data (e.g., reflecting what the plurality of different users have purchased in the past). Based on this analysis, the trained machine learning model may output an indication of at least one second user of the plurality of different users. That at least one second user may be prompted (e.g., with a notification) to reach out to the first user. In this manner, the at least one second user may be able to provide the user feedback about the asset, such as pros/cons, issues with the purchasing process, or the like.

As an example of one problem addressed by the current disclosure, a first user may be shopping for a car, and may indicate (e.g., through their browsing history, such as repeated browsing of an SUV page on a car shopping website) that they are interested in purchasing SUV no older than ten years old. The first user may be friends with various other users that have, at one point, purchased a vehicle of some kind. A somewhat smaller subset of the first user's friend group may have, at some point, owned an SUV that is no older than ten years old. For example, a second user may have at one point owned a new SUV, but may have recently traded it in because the SUV had unforeseen mechanical issues. The first user might not know about this purchasing activity (and the second user's issues), and may make the mistake of purchasing the same (or a similar) SUV for themselves.

Aspects described herein remedy this problem by, as will be explained in greater detail below, using a machine learning model to analyze the first user's purchase intentions, their social network, and the purchasing history of their social network to provide a recommendation of a connection between the first user and the second user. Based on that connection, the second user may be prompted to reach out to the first user to, e.g., warn them about the mechanical issues they had with their SUV. In this manner, even if the first user does not know about the issues the second user had with their SUV, the second user may be able to warn them in advance. In turn, the second user may be rewarded for sharing their knowledge with the first user.

Aspects described herein could not be performed with pen and paper or in the mind of a human being. The machine learning models involved in this disclosure could not be performed in the human mind or with pen and paper in any way. Moreover, the data involved herein (e.g., the combination of purchase intention data, social networking data, and purchase history data processed by the trained machine learning model) is so voluminous and constantly-changing as to not be readily processed by the human mind or with pencil and paper. For example, the social networking data discussed herein is inherently computer-generated and, in many respects, is so voluminous as to prevent ready analysis by a human (whether or not with pen and paper).

Aspects described herein also improve the functioning of computers by improving the way in which computers connect users (e.g., via the Internet) and the way in which computers present information relating to potential purchases to users. Users frequently research potential purchases on the Internet, meaning that significant computer resources are expended as part of the shopping process. The process described herein allows users to more readily learn critical information about assets they have an interest in purchasing, which in turn allows them to avoid endless (e.g., repetitive) searching for such information online.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, and training set data 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
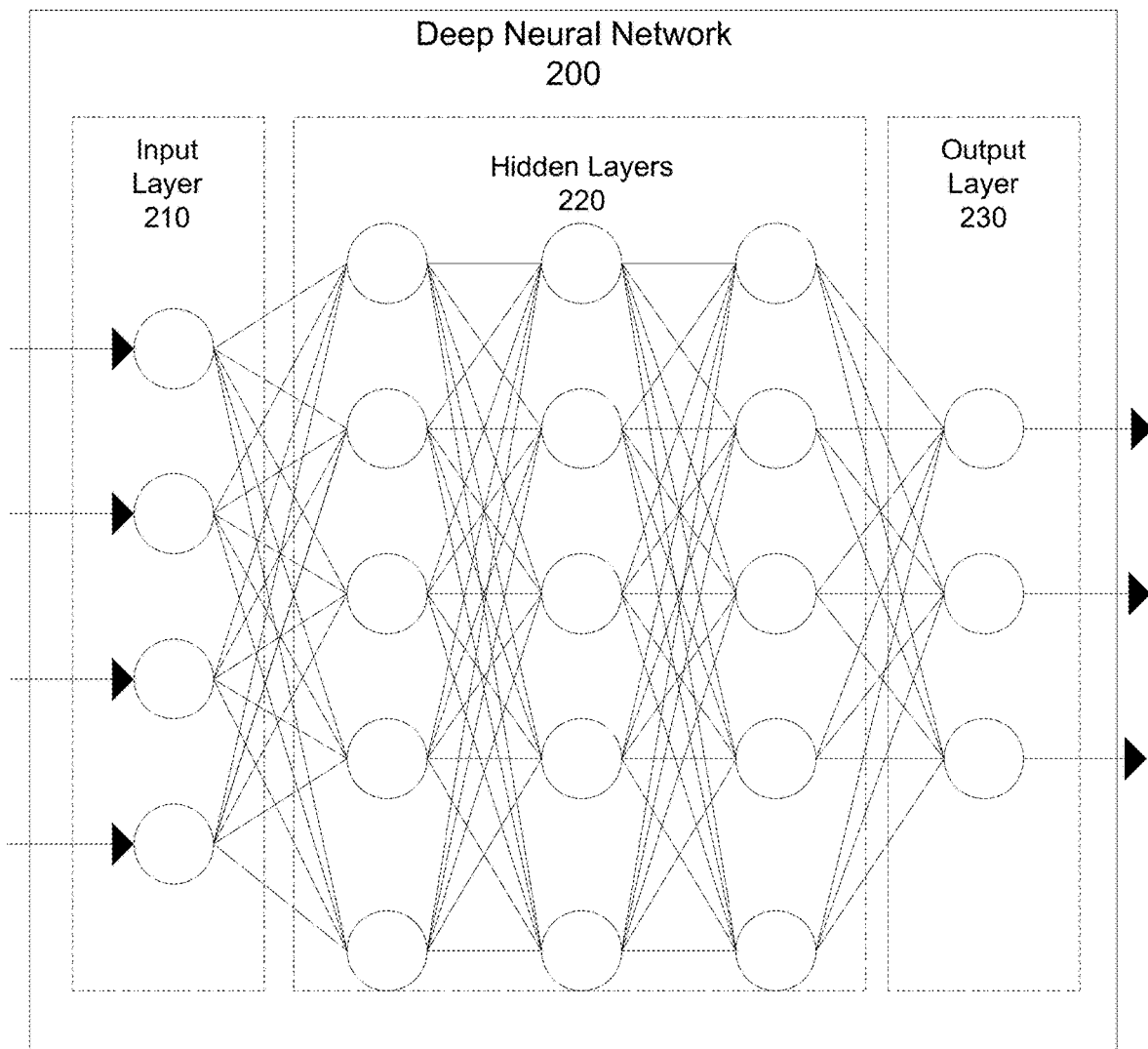
FIG. 2 depicts an example deep neural network architecture for a model according to one or more aspects of the disclosure.

FIG. 2 illustrates an example deep neural network architecture 200. Such a deep neural network architecture may be all or portions of the machine learning software 127 shown in FIG. 1. That said, the architecture depicted in FIG. 2 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
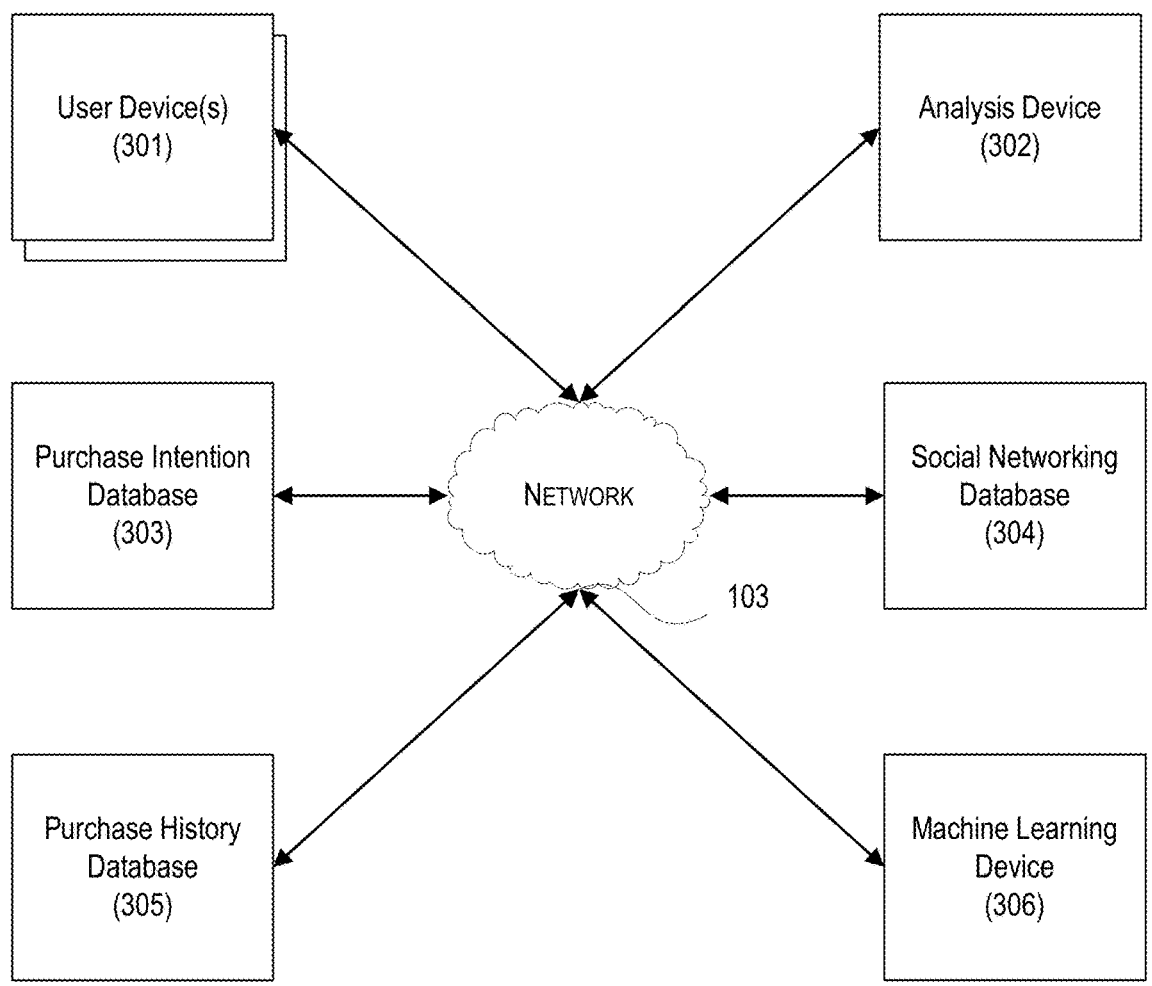
FIG. 3 depicts a system comprising different computing devices that may be used in implementing one or more aspects of the disclosure in accordance with one or more illustrative aspects discussed herein.

FIG. 3 depicts a system which may be used to transmit notifications to prompt users to share their knowledge about assets. One or more user devices 301 are shown as connected to a network 103. The network 103 may be the same or similar as the network 103 of FIG. 1. The network 103 also connects an analysis device 302, a purchase intention database 303, a social networking database 304, a purchase history database 305, and a machine learning device 306. Each of the one or more user devices 301, the analysis device 302, the purchase intention database 303, the social networking database 304, the purchase history database 305, and/or the machine learning device 306 may be one or more computing devices, such as a computing device comprising one or more processors and memory storing instructions that, when executed by the one or more processors, perform one or more steps as described further herein. For example, any of those devices may be the same or similar as the computing devices 101, 105, 107, and 109 of FIG. 1. Though all such devices are depicted as separate elements, the devices may be merged or otherwise combined as desired.

As one example of how the elements depicted in FIG. 3 may operate in accordance herein, a first user device of the user devices 301 may be used to browse car shopping websites. This browsing history may be monitored and, based on that history, an indication that a first user is interested in purchasing a new vehicle may be stored in the purchase intention database 303. That indication may suggest what sort of vehicle the first user is looking for. For example, if the first user was looking at online reviews for SUVs, it may be inferred that the first user wants to buy an SUV. The analysis device 302 may retrieve social networking data associated with the first user from the social networking database 304. That social networking data may indicate that the first user is associated with a plurality of different users, which may be their friends, family, coworkers, and the like. The analysis device 302 may also retrieve purchase history data, corresponding to the plurality of different users, from the purchase history database 305. That data may indicate various assets purchased by the plurality of different users. The analysis device 302 may provide the indication that the first user is interested in purchasing the new vehicle (including, e.g., data indicating the first user is interested in an SUV), the social networking data, and the purchase history data to a trained machine learning model executing on the machine learning device 306. The trained machine learning model on the machine learning device 306 may output one or more second users, of the plurality of different users, that relate to the first user's interest in purchasing a new vehicle. For example, the one or more second users may own, or may have owned, an SUV at some point. The analysis device 302 may then prompt one or more second user devices of the user devices 301 associated with the one or more second users to reach out to the first user. For example, a second user may be prompted to message the first user and provide their thoughts on their ownership of an SUV.

The user devices 301 may be any computing devices which may be associated with users, such as smartphones, laptops, desktops, or the like (e.g., any one of the computing devices 101, 105, 107, and 109 of FIG. 1). The user devices 301 may be capable of browsing the Internet via, e.g., the network 103. This browsing activity may be monitored (e.g., with the permission of the user), and, based on that activity, a computing device may determine that a user is interested in purchasing a particular asset and/or type of asset. For example, if a user frequently browses listings for used trucks, the purchase intention database 303 may store an indication that the user is interested in purchasing a used truck. The user devices 301 may be capable of sending and/or receiving notifications and/or messages. For example, the analysis device 302 may send a notification to one of the user devices 301 that prompts a second user to tell a first user about their shopping experiences. As another example, a first user may be able to use their first user device to message a second user device associated with a second user.

The analysis device 302 may be a computing device, such as a server, configured to collect data (e.g., from databases such as the purchase intention database 303, the social networking database 304, and/or the purchase history database 305), provide input to and/or receive input from machine learning models (e.g., trained machine learning models on the machine learning device 306), and/or send notifications to the user devices 301. While the analysis device 302 is shown in FIG. 3 as a separate element, it need not be. For example, the same computing device may act as the analysis device 302 and comprise the purchase intention database 303, the social networking database 304, the purchase history database 305, and/or the machine learning device 306.

The purchase intention database 303 may store purchase intention data relating to the intention of one or more users to purchase assets (e.g., goods and/or services). The purchase intention data may correspond to a particular asset (e.g., a particular make, model, and year of SUV) and/or a type of asset (e.g., an SUV). Purchase intention data may comprise characteristics about a first user that wants to acquire an asset. Such characteristics may comprise demographic information (e.g., age, location, gender, income level), taste information (e.g., favorite colors, favorite brands), buying habit information (e.g., preferences regarding purchasing online versus in store), and the like. Purchase intention data may comprise preferences corresponding to an asset. For example, the purchase intention data may indicate that a user wants to buy a car of a particular model year (or range of model years), a car with particular features (e.g., heated seats, towing capabilities), a car from a particular brand or brands (e.g., domestic models only), or the like. Such preferences need not be mandatory. For example, a user may generally prefer a car with heated seats, but that preference need not suggest that the user will not consider cars (e.g., cheaper cars) without heated seats. In such a circumstance, the preferences may indicate a strength of the preference: for example, a user may require at least six seats for their family (such that the requirement is strong), but may like a green car (such that the user may nonetheless be willing to buy a black car under certain circumstances). That strength may be represented as subjective values (e.g., "Strong," "Weak"), percentage values (e.g., 90% required, 50% required), or the like. An example of such purchase intention data is provided in FIG. 5B.

The social networking database 304 may store social networking data that comprises a plurality of associations between a plurality of users. Social networking data may be data corresponding to one or more social networking applications (e.g., as provided over the Internet) that reflects associations between two or more users. For example, social networking data may comprise a list of a user's friends on a particular social networking application. As another example, social networking data may comprise an indication of members of a social club that is managed by a social networking application. As yet another example, social networking data might comprise a family tree (e.g., brother-sister relationships, mother-daughter relationships) provided by a social networking application. Social networking data may be retrieved from one or more social networking applications, such that the data may indicate a wide variety of associations between users. For example, a portion of the social networking data might comprise a list of connections a user has on a professional networking application, whereas another portion of the social networking data might comprise a list of connections a user has on a photo sharing website. Such associations may be, for example, family relationship data (e.g., indicating that two users are siblings), friendship data (e.g., indicating that two users are friends on a particular social networking application), group data (e.g., indicating that two users are part of the same company, organization, and/or social club), or the like. An example of such social networking data is provided in FIG. 5A.

The purchase history database 305 may comprise purchase history data that indicates one or more purchases, of one or more assets, made by one or more users. The purchase history data may comprise, for example, a listing of assets purchased by one or more users, including an indication of when the asset was purchased, where the asset was purchased (e.g., which dealer a vehicle was purchased from, which merchant a computer was purchased from), what type of asset was purchased (e.g., the make, model, and year of a vehicle, including any additional packages and/or upgrades), and the like. The purchase history data may be collected from a variety of sources. For example, the purchase history data may be determined by processing e-mails associated with a user to determine whether they purchased an asset. To perform such e-mail processing, an e-mail database may be queried, relevant e-mails relating to purchasing activity may be received, and natural language processing steps may be performed to identify purchases made by the user(s). As another example, the purchase history data may be determined by processing a general ledger of a financial account to identify purchases made by a user. For instance, a computing device may determine that a user has a certain model vehicle based on determining that a user regularly pays for insurance on that vehicle. An example of such purchase history data is provided in FIG. 5C.

The purchase history data may indicate a recency of purchase, by a user, of an asset. A user that has only recently purchased an asset may be able to provide different information about that asset as compared to a user that has owned the same or a similar asset for a long time. For example, a user that has recently purchased an asset may be able to provide detailed information about the purchasing experience (e.g., whether a merchant was hard to deal with), whereas a user that has owned the same asset for a longer period of time may be able to provide feedback on the durability and/or longevity of the asset itself. As such, as will also be discussed below, the trained machine learning model may take the recency of purchase into account when determining whether to prompt a second user (e.g., that owns an asset) to contact a first user (e.g., that may purchase the same asset).

The machine learning device 306 may be a computing device configured to provide one or more machine learning models. The machine learning model may be implemented by the machine learning software 127 and/or the deep neural network 200. A machine learning model may be trained using training data to become a trained machine learning model. The training data may indicate connections between a first plurality of users. The first plurality of users may be a training set of users, such as a large plurality of users that need not necessarily have any interest in purchasing an asset. The training data may indicate characteristics of the first plurality of users. For example, the training data may indicate demographic information for each of the first plurality of users. The training data may indicate a plurality of assets purchased by the first plurality of users. For example, the training data may indicate one or more assets purchased by the first plurality of users, including when the asset(s) were purchased, where the asset(s) were purchased, and the like. Based on this training data, the machine learning model may be trained to recommend a user that should provide information about an asset and/or type of asset. For example, the trained machine learning model may be trained to select users who may be particularly knowledgeable about an asset, such that the trained machine learning model may indicate a connection between a knowledgeable user and a user which might not know about the asset.

Having discussed several examples of computing devices which may be used to implement some aspects as discussed further below, discussion will now turn to a method for determining knowledgeable user(s) and transmitting notifications to those user(s).

Figure 4:
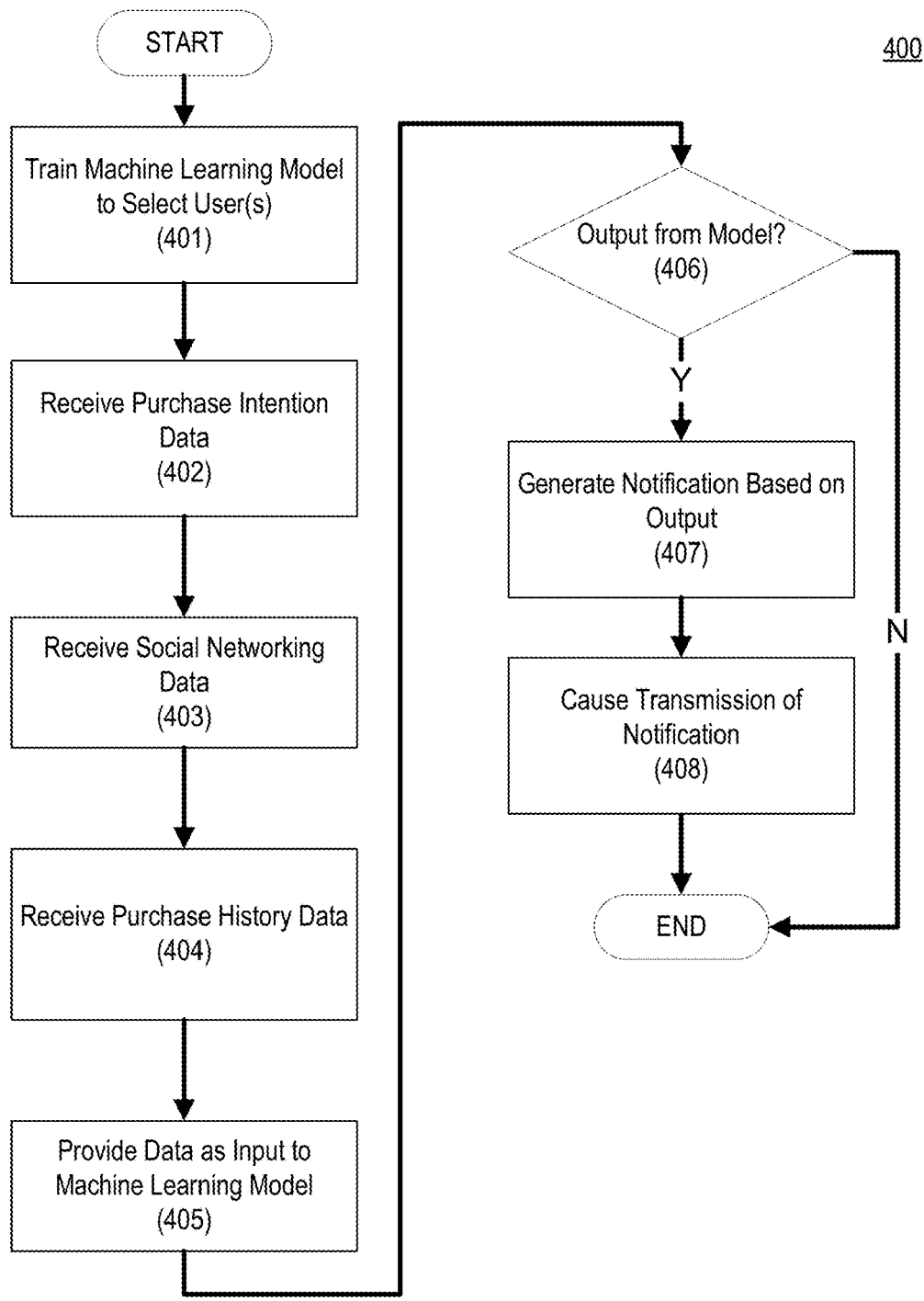
FIG. 4 depicts a flow chart comprising steps which may be performed for using machine learning to output notifications.

FIG. 4 illustrates an example method 400 for transmitting notifications for knowledge-based information exchange in accordance with one or more aspects described herein. The method 400 may be implemented by a suitable computing system, as described further herein. For example, the method 400 may be implemented by any suitable computing environment by a computing device and/or combination of computing devices, such as one or more of the computing devices 101, 105, 107, and 109 of FIG. 1, and/or any computing device comprising one or more processors and memory storing instructions that, when executed by the one or more processors, cause the performance of one or more of the steps of FIG. 4. The method 400 may be implemented in suitable program instructions, such as in machine learning software 127, and may operate on a suitable training set, such as training set data 129. The method 400 may be implemented by computer-readable media that stores instructions that, when executed, cause performance of all or portions of the method 400. The steps shown in the method 400 are illustrative, and may be re-arranged, omitted, and/or otherwise modified as desired.

In step 401, a computing device may train a machine learning model (e.g., implemented on the machine learning device 306, the machine learning software 127, and/or the deep neural network 200) to recommend one or more users. The machine learning model may be trained to recommend one or more users which may provide knowledge about an asset, such as a user that has previously purchased an asset and that may have opinions about the asset. The machine learning model may be trained using training data that indicates purchase activity between users and connections between those users, and may thereby be trained to select one or more users based on associations between those users. For example, the computing device may train, using training data indicating connections between a first plurality of users, characteristics of the first plurality of users, and a plurality of assets purchased by the first plurality of users, a machine learning model to select one or more of the first plurality of users. The selection of one of these connections may thereby select a user (e.g., a friend and/or family member of a user) who may be knowledgeable about an asset.

The training data described above is illustrative, and the machine learning model may be trained in a number of ways. For example, the trained machine learning model may be provided, as training data, a history of communications between users relating to assets to determine which properties of those users led one user to inform another user about the asset. As another example, the trained machine learning model may be provided, as training data, an indication of which users in a community may be likely to share information about assets they have purchased.

The machine learning model may be trained using the same plurality of users that are indicated in the social networking data (e.g., stored in step 403). For example, at least a portion of the first plurality of users (e.g., used to train the machine learning model) may be the same as the second plurality of users (e.g., indicated by the social networking data, as discussed below). In this manner, the machine learning model may be trained on a particular plurality of users, such as users in a particular community, in a particular geographic location, or the like. For example, a machine learning model may be trained based on users in a particular town, in a particular demographic (e.g., thirtysomethings living in a city), or the like. As such, multiple trained machine learning models may be maintained, each for a different group of users.

In step 402, the computing device may receive purchase intention data from, e.g., the purchase intention database 303. The purchase intention data may provide information about an intent, by a first user, to purchase an asset and/or type of asset. That information may include what type(s) of asset, the first user is interested in (e.g., a truck, an SUV), and/or characteristic information about the user (e.g., their income level, their preferred brands). In this manner, the computing device may receive purchase intention data that indicates an intention of a first user to acquire a type of asset, wherein the purchase intention data indicates characteristics of the first user and preferences of the first user corresponding to the type of asset. For example, the purchase intention data might indicate that a twentysomething college graduate in New York is interested in purchasing their first car, and would prefer a car that is small and red.

The purchase intention data need not specify the exact asset which a user wants to purchase. For example, a user may want to buy a new vehicle, but not know whether they want to buy a sedan, a truck, or an SUV. In such a circumstance, the user may be interested in a type of asset (e.g., a vehicle), and may even have preferences regarding some features of that asset (e.g., wanting a vehicle with heated seats), but might not have decided as to which particular asset to purchase. As such, as discussed above with respect to the purchase intention database 303, the purchase intention data might indicate various user preferences with different strengths (e.g., must-have features of the asset, features that the user would like but does not feel strongly about, etc.).

The purchase intention data need not be manually created by a user. For example, the purchase intention data may reflect activity, by the user, that indicates a desire of the user to purchase an asset (and/or type of asset). Along these lines, receiving the purchase intention data may comprise monitoring web browsing activity of a user. A user may opt-in to a monitoring scheme where their web activity is monitored. Based on such monitoring, the computing device may determine that the user is interested in purchasing an asset and/or a type of asset. For example, the computing device may collect web activity data by monitoring web browsing activity of the first user and detect, based on the web activity data, that the first user is browsing web pages associated with the type of asset. As part of this monitoring scheme, websites that the user browses may be compared to a database of known websites associated with an intent to purchase an asset (and/or type of asset). For example, if a user browses a car shopping website, that browsing activity may suggest that the user is interested in purchasing a car.

In step 403, the computing device may receive social networking data from, e.g., the social networking database 304. The social networking data may indicate connections between the first user and one or more different users on, e.g., one or more social networking applications. For example, the computing device may receive social networking data that comprises a plurality of associations between a second plurality of users. Those associations may indicate familial relationships, friendships, memberships in a group, or the like. The social networking data might comprise data from a variety of social networking applications, such as chat applications, photo sharing websites, or the like.

Receiving the social networking data may comprise analyzing a similarity between the first user and one or more different users. Even though a user may have purchased an asset that a second user is interested in, that does not necessarily mean that the user can provide the second user valuable insight. After all, if the users are different (e.g., in terms of income level, lifestyle, or the like), their advice might not be particularly useful. As such, as part of determining which users to connect for the purposes of knowledge sharing, it may be useful to determine how similar a first user and one or more different users are. Such similarities may be based on their characteristics, such as their age, lifestyle, income level, or the like. For example, the computing device may determine a similarity between the characteristics of the first user and characteristics of the second plurality of users. In that example, the input data provided to the trained machine learning model (as discussed below) may comprise an indication of the similarity between the characteristics of the first user and characteristics of the one or more users. In that manner, the trained machine learning model may be able to connect users in a manner which allows one user to provide more pertinent advice to another user.

Receiving the social networking data may comprise determining group relationships between users. In addition to friendships and familial relationships, users may share a group, such as being members of a social club, an organization (e.g., an employer), or the like. While such group relationships might not be as strong as familial relationships under certain circumstances, they may nonetheless be useful in that members of the group may be able to share valuable (and trustworthy) asset information with one another. In turn, it may be valuable to provide the trained machine learning model indications of users that have shared group memberships, even if those users are not necessarily friends or family. For example, if a first user and a second user are both members of a car aficionados' group on a social networking platform, they might trust each other's opinion regarding cars more than they would other users. As such, the input data provided to the trained machine learning model (as detailed below) may comprise, for example, an indication of whether the first user and the second plurality of users are members of a group.

In step 404, the computing device may receive purchase history data from, e.g., the purchase history database 305. Purchase history data may indicate purchases made by one or more users in the past. For example, the computing device may receive purchase history data indicating one or more purchases, of one or more assets associated with the type of asset, made by the second plurality of users. The purchase history data may indicate, for one or more of the second plurality of users, an asset they purchased (whether or not the same or similar to that the first user might be interest in buying), how much they spent on the asset, whether they still own the asset, and the like. The purchase history data may additionally and/or alternatively indicate a recency of purchase, one or more assets, by the second plurality of users. In this manner, the trained machine learning model may be able to connect a first user with a second user that has recently purchased the asset and/or a second user that has had the asset for a relatively long time. As indicated above with respect to the purchase history database 305, there may be instances when a first user should be connected with a second user that recently purchased an asset instead of a third user that has owned an asset for a relatively longer time. For example, the second user that recently purchased the asset might recall more about the purchasing process (e.g., whether a merchant was difficult to work with), whereas the third user that has owned the asset for a relatively longer time might better know about the longevity and/or durability of the asset.

Receiving the purchase history data may comprise analyzing where users made purchases. It may be valuable to connect users with others users that have purchased assets in their area and/or from locations where they may also purchase the same or a similar asset. For example, the computing device may process the purchase history data to identify one or more merchants where the second plurality of users purchased the one or more assets. In this circumstance, the input data provided to the trained machine learning model may comprise an indication of the one or more merchants. As such, the machine learning model may be able to recommend a second user that has purchased an asset from the same and/or a similar location where the first user may purchase the same asset.

In step 405, the computing device may provide the data received in step 402 through 404 as input to the trained machine learning model. For example, the analysis device 302 may transmit the data over the network 103 to the machine learning device 306. The data received in step 402 through step 404 may be provided as input data. For example, the computing device may provide, to the trained machine learning model, input data comprising the purchase intention data, the social networking data, and the purchase history data.

In step 406, the computing device may determine whether it received output from the trained machine learning model. The output from the trained machine learning model may indicate at least one second user which, as will be described below, may be willing to contact the first user to provide knowledge about an asset and/or type of asset. That second user may have, at some point, purchased the asset or type of asset. For example, the computing device may receive, as output from the trained machine learning model and based on the input data, an indication of at least one second user of the second plurality of users, wherein the at least one second user is associated with a purchase of a second asset associated with the type of asset. If output has been received, the method 400 proceeds to step 407. Otherwise, the method 400 ends.

It is possible that the trained machine learning model might not return any users, of the second plurality of users. For example, it is possible that none of the users indicated in the social networking data received in step 403 would be a good source of knowledge for the first user. In such a circumstance, as indicated above, the method 400 may end.

In step 407, the computing device may generate a notification based on the output. A notification may be any form of contact that might initiate communications between the first user (e.g., the user looking to purchase an asset or type of asset) and a second user (e.g., a user knowledgeable about the asset or type of asset). A notification may prompt the second user to contact the first user regarding the asset and/or type of asset referenced in the purchase intention data received in step 402. For example, the computing device may generate, for the at least one second user, a notification prompting the second user to contact the first user regarding the intention of the first user to acquire the type of asset. Such a notification may prompt the second user to provide specific recommendations to the first user regarding a merchant where they purchased the asset and/or type of asset (e.g., and whether the first user should also buy the asset or type of asset from that merchant). Such a notification may additionally and/or alternatively prompt the second user to provide specific recommendations regarding the price of the asset and/or type of asset (e.g., how much the first user should expect to spend). Such a notification may additionally and/or alternatively prompt the second user to provide specific recommendations regarding the durability and/or longevity of the asset or type of asset.

The second user may be incentivized to respond to the notification generated in step 407. A quantity of rewards may be provided to a user based on their response to a notification. For example, the second user may be rewarded a predetermined number of points if they contact the first user regarding their intention to purchase the asset and/or type of asset. Such points may be redeemable for, e.g., gifts and/or rewards, and may thereby incentivize the second user to contact the first user and provide information about the asset and/or type of asset. The second user might be rewarded by the first user. For instance, the first user might be prompted to provide a tip to the second user if they provide information about the asset. In this manner, the second user might be incentivized to aid the first user. For example, as part of generating the notification in step 407, the first user might be prompted to provide an indication of a tip (e.g., ten dollars). The notification generated in step 407 might indicate the amount of the tip (e.g., "Will you provide User A feedback about your SUV? They have offered a ten-dollar reward for your thoughts!"). Then, if the second user accepts the notification (and, e.g., instantiates a chat session with the first user), the second user might be provided the tip. For example, the tip might be added to a bank account of the second user.

In step 408, the computing device may cause transmission of a notification. The notification may be transmitted to a user device, such as one or more of the user devices 301. For example, the computing device may cause the notification to be transmitted to the second user. As part of this transmission, a user device of the user devices 301 corresponding to the second user may be identified. For example, the social networking data from the social networking database 304 may be processed to identify a digital address (e.g., e-mail address, social media account) associated with the second user, and the notification may be transmitted to that digital address.

The process with which notifications might be provided may be anonymized. For example, the second user (e.g., the recipient of the notification transmitted in step 408) need not know that they are providing advice to the first user (e.g., interested in purchasing the asset). As such, as part of transmitting the notification in step 408, an anonymous chat instance might be instantiated between the second user and the first user. This might advantageously allow the second user to provide trusted information to the first user without, e.g., pressure from preexisting social relationships. That said, it might additionally and/or alternatively be advantageous to allow the first user to know the second user's identity, as the second user's identity might provide additional weight to their opinions regarding an asset. As such, in some circumstances, a chat might be instantiated using a preexisting social media application, such that the chat might indicate the identities of the first user and/or the second user.

Figure 5A:
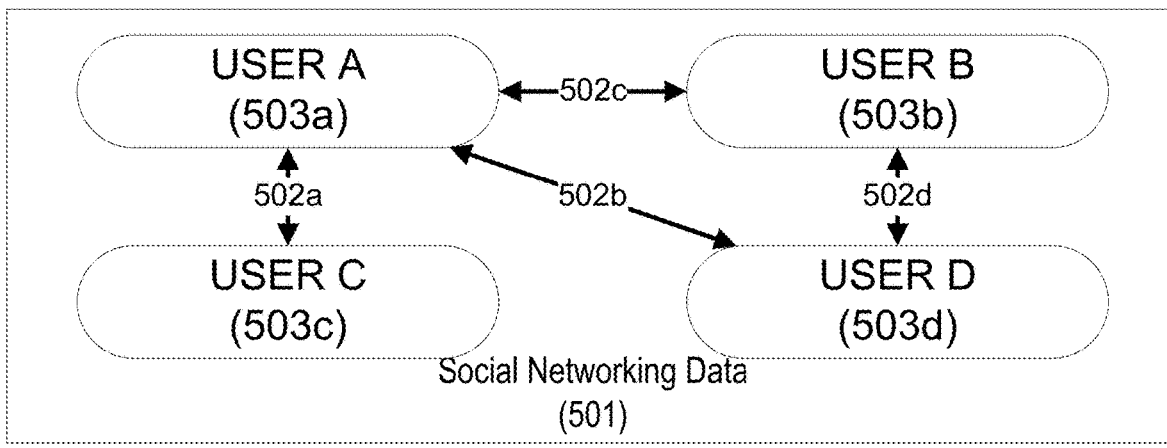
FIG. 5A depicts illustrative social networking data.

FIG. 5A depicts an example of social networking data 501. The social networking data 501 may be the same or similar as that discussed with respect to step 403 of FIG. 4. FIG. 5 depicts the social networking data 501 with a user A 503a, a user B 503b, a user C 503c, and a user D 503d. The user A 503a is connected with User C 503c via connection 502a, with user D 503d via connection 502b, and with user B 503b via connection 502c. The user B 503b is connected with the user D 503d via connection 502d. The users and connections in the social networking data 501 are illustrative, and have been simplified for the purposes of example. The connections depicted between the users in the social networking data 501 may be, for example, friendships, familial relationships, relationships by virtue of being in the same or similar groups (e.g., social clubs, organizations), or the like.

Figure 5B:
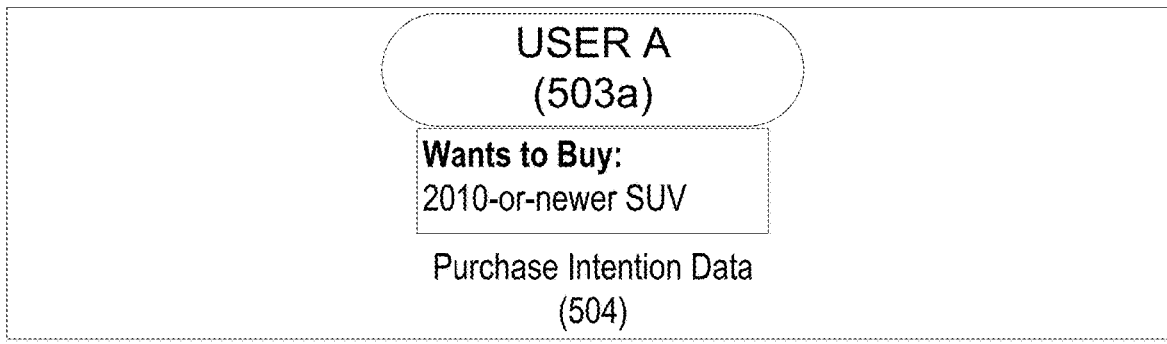
FIG. 5B depicts illustrative purchase intention data.

FIG. 5B depicts an example of purchase intention data 504. The purchase intention data 504 indicates that the user A 503a wishes to buy a 2010-or-newer SUV. This purchase intention data 504 may have been generated as part of the user A 503a browsing a car shopping website and searching for 2010-or-newer SUVs. In other words, as indicated above with respect to step 402 of FIG. 4, the purchase intention data 504 may have been generated as part of monitoring the web browsing activity of the user A 503a.

Figure 5C:
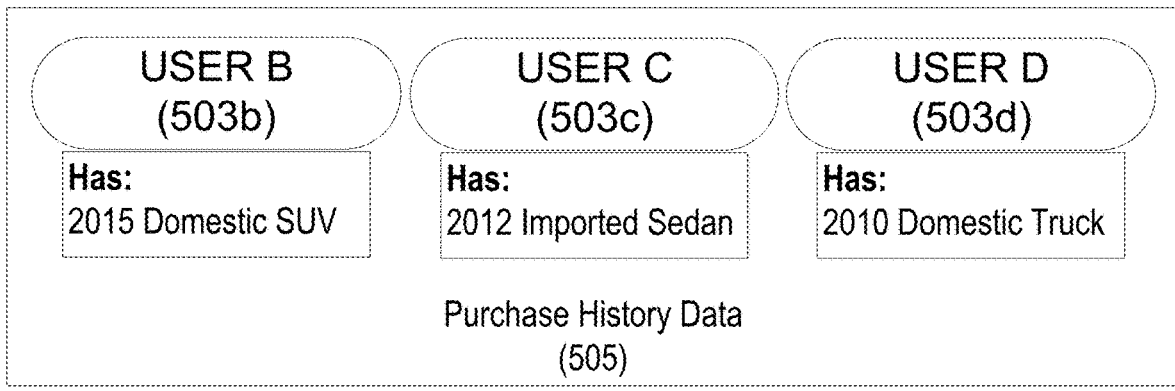
FIG. 5C depicts illustrative purchase history data.

FIG. 5C depicts an example of purchase history data 505. The purchase history data 505 may be the same or similar as discussed with respect to step 404 of FIG. 4. The purchase history data 505 indicates that the user B 503b owns a 2015 domestic SUV, that the user C 503C has a 2012 imported sedan, and that the user D 503d has a 2010 domestic truck. Because this example has been simplified, the user most pertinent to the purchase intention of the user A 503a is fairly straightforward: the user A 503a wants a 2010-or-newer SUV, and the user B 503b has such an SUV. That said, in practice, the purchase history data 505 may be significantly more complicated. For example, hundreds (if not thousands) of different users may be analyzed, each with different characteristics (e.g., locations, purchase habits, income levels), and each with different products purchased. As such, in many circumstances, the purchase history data 505 may comprise hundreds of different users satisfying the criteria provided by the purchase intention data 504, and the trained machine learning algorithm may be trained to select one or more users from those hundreds of different users based on, for example, the demographics of those users, the criteria of the asset searched for by the user, and the like.

Figure 5D:
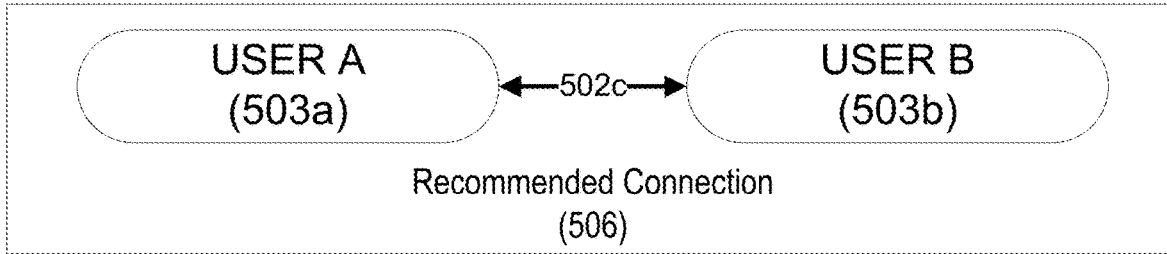
FIG. 5D depicts an example of a recommended connection.

FIG. 5D depicts an example of output from the trained machine learning model. In this circumstance, the trained machine learning model has output a recommended connection 506; specifically, the connection 502c between the user A 503a and the user B 503b. Such output may cause generation of a notification, to the user B 503b, to contact the user A 503a about their search for a 2010-or-newer SUV.

Figure 6A:
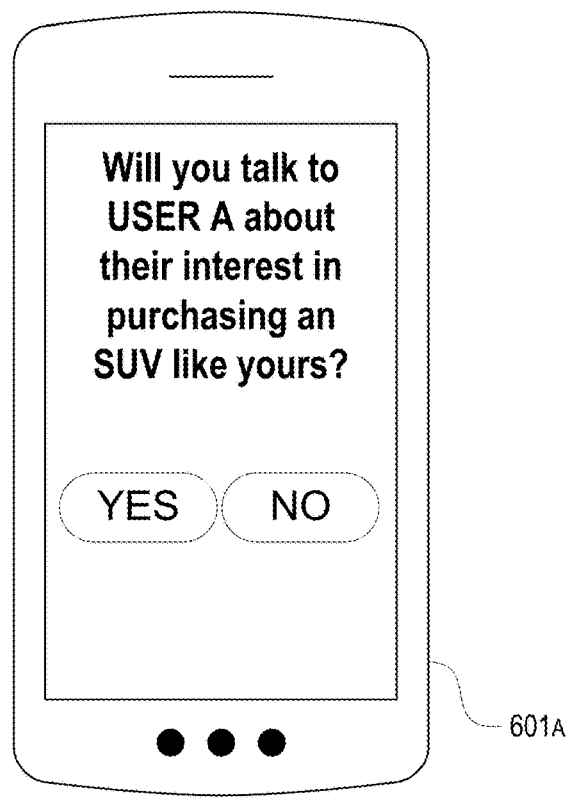
FIG. 6A depicts a first example notification.

FIG. 6A depicts an example of a notification 601a that may be sent to a user. Such a notification may be sent to, e.g., a second user, and may prompt the second user to provide knowledge about their purchase of an asset to a first user, such that the first user may learn more about a product they are shopping for. In particular, the notification 601a prompts the second user (e.g., the user B 503b from FIG. 5D) to speak with the user A 503a regarding their interest in purchasing an SUV "like yours." Accepting this offer (e.g., and speaking with the user A 503a) may cause the second user to be provided a reward, such as a number of points redeemable for rewards. This may operate to gamify the knowledge-sharing process.

Figure 6B:
FIG. 6B depicts a second example notification.

FIG. 6B depicts a different example of a notification 601b that may be sent to a user. In this circumstance, the notification 601b asks whether a second user (e.g., the recipient of the notification, such as the user B 503b from FIG. D) would recommend one dealer or another. In this manner, the second user may be prompted to recommend a merchant where they purchased an asset. Because the second user may have had a bad experience when purchasing their asset at a particular merchant, the notification 601b allows the second user to indicate that the first user should shop elsewhere.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
   one or more processors; and
   memory storing instructions that, when executed by the one or more processors, cause the computing device to:
   determine, for a demographic of users, training data indicating:
   first connections between a first plurality of users that are members of the demographic, first characteristics of the first plurality of users that
are members of the demographic,
a first plurality of assets purchased by the first
plurality of users that are members of the demographic, and
a history of communications between the first plurality of users relating to the first plurality of
assets;
train, using the training data, a machine learning model,
implemented via an artificial neural network and
comprising a plurality of nodes, to:
receive input indicating second connections between
a third plurality of users, second characteristics of
the third plurality of users, and a second plurality
of assets purchased by the third plurality of users,
and
output, based on the input, one or more of the third
plurality of users, wherein training the machine
learning model comprises modifying, based on the
training data, a weight between at least two of the
plurality of nodes such that, when provided at
least a portion of the training data, the machine
learning model outputs one of the plurality of
members based on the connections between the
plurality of members and the assets purchased by
the plurality of members;
collect web activity data by monitoring web browsing
activity of a first user, wherein the web activity data
indicates preferences of the first user corresponding
to a type of asset;
determine social networking data that comprises a
plurality of associations between a second plurality
of users;
identify, based on purchase history data corresponding
to the type of asset, one or more merchants where the
second plurality of users purchased the one or more
assets;
input, to an input node of the plurality of nodes of the
trained machine learning model, input data comprising:
the web activity data,
an indication of the one or more merchants,
the social networking data, and
the purchase history data,
determine, based on output received via an output node
of the plurality of nodes of the trained machine
learning model, at least one second user of the
second plurality of users, wherein the at least one
second user has purchased a second asset that is the
type of asset;
generate, for the at least one second user, a notification
prompting the second user to contact the first user
regarding an intention of the first user to acquire the
type of asset; and
cause the notification to be transmitted to the second user.

2. The computing device of claim 1, wherein the instructions, when executed by the one or more processors, cause the computing device to determine the web activity data by causing the computing device to:
detect, based on the web activity data, that the first user is browsing web pages associated with the type of asset.

3. The computing device of claim 1, wherein the instructions, when executed by the one or more processors, cause the computing device to:
determine a similarity between the type of asset and the one or more assets, wherein the input to the input node further comprises an indication of the similarity between the type of asset and the one or more assets.

4. The computing device of claim 1, wherein the instructions, when executed by the one or more processors, cause the computing device to:
determine a similarity between characteristics of the first user and characteristics of the second plurality of users, wherein the input to the input node further comprises an indication of the similarity between the characteristics of the first user and characteristics of the second plurality of users.

5. The computing device of claim 1, wherein the input to the input node further comprises an indication of whether the first user and the second plurality of users are members of a group.

6. The computing device of claim 1, wherein the purchase history data indicates a recency of purchase, one or more assets, by the second plurality of users.

7. The computing device of claim 1, wherein at least a portion of the first plurality of users is the same as the second plurality of users.

8. The computing device of claim 1, wherein the history of communications between the first plurality of users relating to the first plurality of assets comprises one or more indications of properties of the first plurality of assets.

9. A method comprising:
determining, for a demographic of users, training data indicating;
first connections between a first plurality of users that are members of the demographic,
first characteristics of the first plurality of users that are members of the demographic,
a first plurality of assets purchased by the first plurality of users that are members of the demographic, and
a history of communications between the first plurality of users relating to the first plurality of assets;
training, using the training data, a machine learning model, implemented via an artificial neural network and comprising a plurality of nodes, to:
receive input indicating second connections between a third plurality of users, second characteristics of the third plurality of users, and a second plurality of assets purchased by the third plurality of users, and
output, based on the input, one or more of the third plurality of users, wherein training the machine learning model comprises modifying, based on the training data, a weight between at least two of the plurality of nodes such that, when provided at least a portion of the training data, the machine learning model outputs one of the plurality of members based on the connections between the plurality of members and the assets purchased by the plurality of members;
collecting web activity data by monitoring web browsing activity of a first user, wherein the web activity data indicates preferences of the first user corresponding to a type of asset;
determining social networking data that comprises a plurality of associations between a second plurality of users;
identifying, based on purchase history data corresponding to the type of asset, one or more merchants where the second plurality of users purchased the one or more assets;
inputting, to an input node of the plurality of nodes of the trained machine learning model, input data comprising:
the web activity data, an indication of the one or more merchants,
the social networking data, and
the purchase history data;
determining, based on output received via an output node of the plurality of nodes of the trained machine learning model, at least one second user of the second plurality of users, wherein the at least one second user has purchased a second asset that is the type of asset;
generating, for the at least one second user, a notification prompting the second user to contact the first user regarding an intention of the first user to acquire the type of asset; and
causing the notification to be transmitted to the second user.

10. The method of claim 9, wherein determining the web activity data comprises:
detecting, based on the web activity data, that the first user is browsing web pages associated with the type of asset.

11. The method of claim 9, further comprising:
determining a similarity between the type of asset and the one or more assets, wherein the input to the input node further comprises an indication of the similarity between the type of asset and the one or more assets.

12. The method of claim 9, further comprising:
determining a similarity between characteristics of the first user and characteristics of the second plurality of users, wherein the input to the input node further comprises an indication of the similarity between the characteristics of the first user and characteristics of the second plurality of users.

13. The method of claim 9, wherein the input to the input node further comprises an indication of whether the first user and the second plurality of users are members of a group.

14. The method of claim 9, wherein the history of communications between the first plurality of users relating to the first plurality of assets comprises one or more indications of properties of the first plurality of assets.

15. One or more non-transitory computer-readable media storing instructions that, when executed by one or more processors, cause a computing device to:
determine, for a demographic of users, training data indicating:
first connections between a first plurality of users that are members of the demographic,
first characteristics of the first plurality of users that are members of the demographic,
a first plurality of assets purchased by the first plurality of users that are members of the demographic, and
a history of communications between the first plurality of users relating to the first plurality of assets;
train, using the training data, a machine learning model, implemented via an artificial neural network and comprising a plurality of nodes, to:
receive input indicating second connections between a third plurality of users, second characteristics of the third plurality of users, and a second plurality of assets purchased by the third plurality of users, and
output, based on the input, one or more of the third plurality of users, wherein training the machine learning model comprises modifying, based on the training data, a weight between at least two of the plurality of nodes such that, when provided at least a portion of the training data, the machine learning model outputs one of the plurality of members based on the connections between the plurality of members and the assets purchased by the plurality of members;
collect web activity data by monitoring web browsing activity of a first user, wherein the web activity data indicates:
preferences of the first user corresponding to a type of asset;
determine social networking data that comprises a plurality of associations between a second plurality of users;
identify, based on purchase history data corresponding to the type of asset, one or more merchants where the second plurality of users purchased the one or more assets;
input, to an input node of the plurality of nodes of the trained machine learning model, input data comprising:
the web activity data,
an indication of the one or more merchants,
the social networking data, and
the purchase history data;
determine, based on output received via an output node of the plurality of nodes of the trained machine learning model, at least one second user of the second plurality of users, wherein the at least one second user has purchased a second asset that is the type of asset;
generate, for the at least one second user, a notification prompting the second user to contact the first user regarding an intention of the first user to acquire the type of asset; and
cause the notification to be transmitted to the second user.

16. The non-transitory computer-readable media of claim 15, wherein the instructions, when executed by the one or more processors, cause the computing device to determine the web activity data by causing the computing device to:
detect, based on the web activity data, that the first user is browsing web pages associated with the type of asset.

17. The non-transitory computer-readable media of claim 15, wherein the instructions, when executed by the one or more processors, cause the computing device to:
determine a similarity between the type of asset and the one or more assets, wherein the input to the input node further comprises an indication of the similarity between the type of asset and the one or more assets.

18. The non-transitory computer-readable media of claim 15, wherein the instructions, when executed by the one or more processors, cause the computing device to:
determine a similarity between characteristics of the first user and characteristics of the second plurality of users, wherein the input to the input node further comprises an indication of the similarity between the characteristics of the first user and characteristics of the second plurality of users.

19. The non-transitory computer-readable media of claim 15, wherein the input to the input node further comprises an indication of whether the first user and the second plurality of users are members of a group.

20. The one or more non-transitory computer-readable media of claim 15, wherein the history of communications between the first plurality of users relating to the first plurality of assets comprises one or more indications of properties of the first plurality of assets.

* * * * *